US005390819A

United States Patent [19]

Kaye

[11] Patent Number: 5,390,819

[45] Date of Patent: Feb. 21, 1995

[54] STACK AND DISPENSER OF REPOSITIONABLE ADHESIVE SHEETS

[75] Inventor: Howard B. Kaye, Syracuse, N.Y.

[73] Assignee: PCI Paper Conversions, Inc., Syracuse, N.Y.

[21] Appl. No.: 91,379

[22] Filed: Jul. 15, 1993

[51] Int. Cl.$^{6}$ .............. C09J 7/02

[52] U.S. Cl. .............. 221/45; 428/40; 428/195; 428/343

[58] Field of Search .............. 428/40, 343; 221/22, 221/33, 45; 206/447

[56] References Cited

U.S. PATENT DOCUMENTS 4,416,392 11/1983 Smith .............. 221/45
4,781,306 11/1988 Smith .............. 221/33
4,882,211 11/1989 McIntyre .............. 428/40
4,967,740 11/1990 Riedel .............. 428/40
5,080,254 1/1992 Feer .............. 221/33
5,286,546 2/1994 Su .............. 428/40

*Primary Examiner*—Jenna L. Davis
*Attorney, Agent, or Firm*—Charles J. Brown

[57] ABSTRACT

A stack and dispenser of repositionable adhesive sheets wherein the adhesive is confined to alternate opposite corner areas of successive sheets in the stack so that as each successive sheet is peeled away from the next an advancing line of separation between its adhesive-coated corner area and the next sheet becomes progressively shorter until reducing to a point upon complete separation.

7 Claims, 2 Drawing Sheets

STACK AND DISPENSER OF REPOSITIONABLE ADHESIVE SHEETS

In U.S. Pat. No. 4,781,306 a stack of flexible sheet material is disclosed wherein sheets are disposed one over the other each with a band of repositionable adhesive coated along one full edge thereof and the sheets are stacked with the adhesive-coated edge of each successive sheet disposed along alternate opposite edges to maintain the sheets in the stack. A dispenser for the stack is described in that patent whereby each sheet is withdrawn successively through a slot disposed generally parallel to the edge bands of adhesive on the respective sheets in the stack within the dispenser.

It has been observed in products made in accordance with that patent that as each successive sheet is withdrawn through the dispenser slot and its extended adhesive band is peeled away from the next sheet there is an advancing line of separation between the adhesive band and the next sheet which remains at the full length of the band and edge portion during the entire peeling process. This is a consequence of disposing the band of adhesive along the full length of the edge portion. Inherent in this design is that some measurable curl of the sheet is induced along the full adhesive-coated band from the beginning of the separation process until the end, and as a consequence a certain amount of set to that curl may remain in the fully separated sheet. Since the sheets are intended to lie flat during use when releasably applied to a surface any such set curl is a disadvantage.

In conventional ordinary pads of sheets where one sheet is releasably secured to the next by pressure sensitive adhesive similarly situated on the same edge of all of the sheets, it is known to locate the adhesive in configurations other than along an edge band, even perhaps locating the adhesive in a corner triangular area. However the sheets of such conventional pads are not associated with a dispenser from which they can be drawn successively through a slot one after another. Since they are not confined to a dispenser, each sheet of such conventional pads may be separated from the next by peeling off at various arbitrary angles so that the advancing line of separation as peeling progresses is not restricted to a line of a length equal to the full length of the adhesive band. However when placed in a dispenser and withdrawn through a fixed slot the progressive line of separation during the peeling process is predetermined and not capable of being varied.

It is a principal object of the invention to improve upon the adhesive placement in the stacks of sheets described in the above-identified prior art patent so that as each successive sheet is withdrawn through a dispenser slot and peeled away from the next sheet the advancing line of separation between its adhesive-coated area and the next sheet becomes progressively shorter until reducing to a point upon complete separation. The purpose is to preclude a separation line remaining at the full length of the adhesive edge band until complete separation, which might induce an unwanted permanent set curl in the separated sheets. The ultimate object is to improve the ability of the separated sheets to lie flat during use.

SUMMARY OF THE INVENTION

In accordance with the invention an improvement is made in a stack of flexible polygonal sheets in combination with a dispenser disposed one over another with a low tack repositionable adhesive on alternate opposite coated areas of successive sheets in the stack. According to the improvement the adhesive-coated areas are confined to alternate opposite corner areas of successive sheets in the stack. The dispenser defines an exit slot over the stack through which each successive sheet is withdrawable with a corner leading. As a consequence when each successive sheet is withdrawn through the dispenser slot and peeled away from the next sheet an advancing line of separation between its adhesive-coated corner area and the next sheet becomes progressively shorter until reducing to a point upon complete separation.

It is preferred that the adhesive-coated areas are on the underside of all of the sheets and an adhesive-free corner leads from the dispenser slot during withdrawal. The sheets of the stack are rectangular. The corner areas of adhesive may be triangular and coincident with two straight side edge portions of the sheet meeting at a corner point and a third straight side joining ends of said edge portions remote from said corner point. The triangular area may be that of an isosceles triangle and the lengths of the two straight side edge portions may be less than half the full length of any of the sheet edges. The sheet material may have a certain grain direction and the line of separation during peeling may be transverse to that grain direction.

DESCRIPTION OF PREFERRED EMBODIMENT

Figure 1:
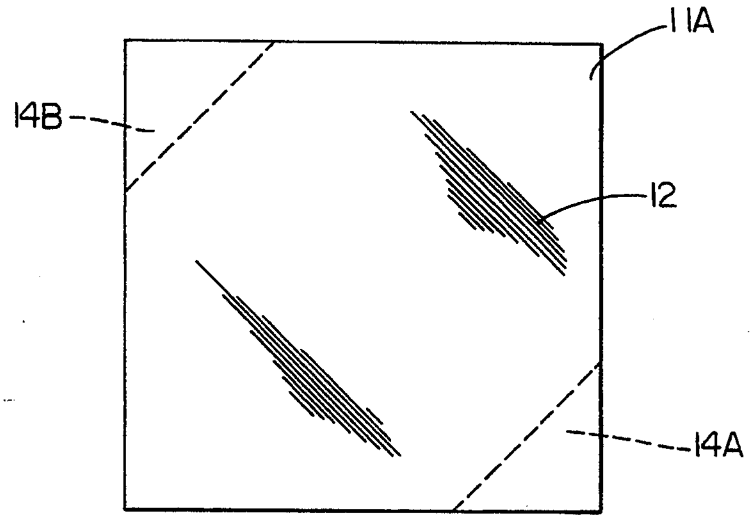
FIG. 1 is a plan view of a stack of sheets with the adhesive corner placement of the invention.
Figure 2:
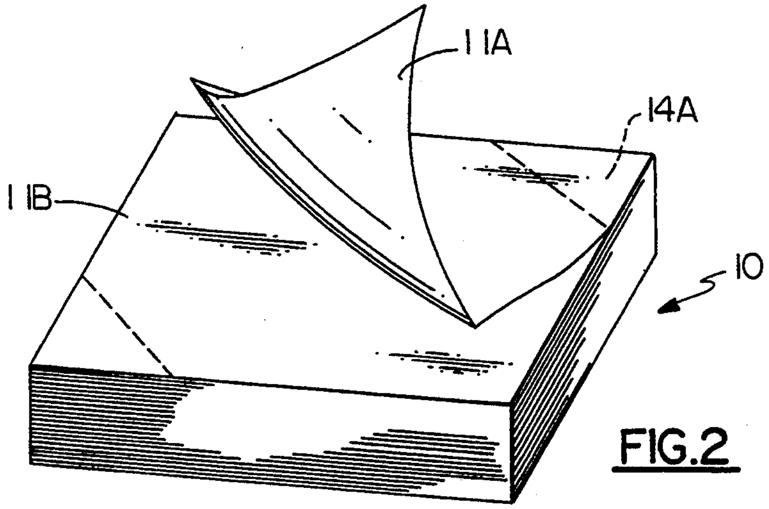
FIG. 2 is a perspective view of the sheet stack of FIG. 1 with the top sheet curled back from the next sheet in the stack.

Referring first to FIGS. 1 and 2 a stack 10 of rectangular flexible sheets is shown with the topmost sheet indicated by 11A and the next sheet by 11B. The sheets may be of paper or plastic film. If of paper there will be a certain observable grain direction in the sheet material as illustrated by the lines 12 in FIG. 1. There is a greater resistance to curling across that grain than parallel to it. Consequently, where a return to flatness after curling is desirable, which is the case with the sheets of the present invention, it is preferable that any curling be transverse to the grain direction rather than around or parallel to it.

At opposite alternating underside corners of the sheets 11A, B, etc. are deposits of adhesive. The adhesive deposit on the sheet 11A is indicated as 14A and the adhesive deposits on the successive sheets are designated 14B, 14C, etc. The adhesive is low-tack repositionable adhesive which allows for separation of the sheets and repositioning of the separated sheets on typically flat receiving surfaces. One preferred form of such adhesive is described in U.S. Pat. No. 4,495,318, and another form is described in the aforementioned U.S. Pat. No. 4,781,306.

Figure 3:
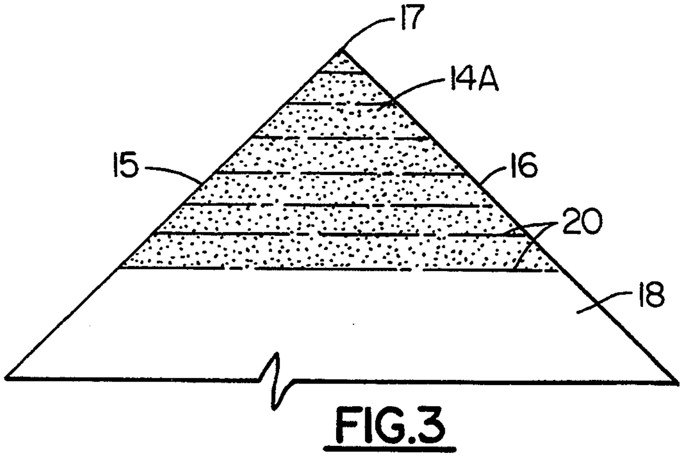
FIG. 3 is an enlarged fragmentary plan view of the triangular corner placement of the adhesive on the underside of one sheet of the stack of FIGS. 1 and 2.

Referring to FIG. 3 the deposit of adhesive 14A is shown on the underside of the corner of the top sheet 11A. The corner area of the adhesive 14A is triangular and coincident with straight sided edge portions 15 and 16 of the sheet 11A meeting at a corner point 17 and a third straight side 18 joining ends of the two edge portions 15 and 16 remote from the corner point 17. The straight side edge portions 15 and 16 are preferably of equal length so that the triangular area of adhesive 14A is an isosceles triangle. The equal lengths of side edge portions 15 and 16 are well less than half the full length of any of the sheet edges of the rectangular sheet 12, which means that the adhesive area 14A is confined to a relatively small tip portion of the sheet corner.

It will be understood that as the sheet 11A is peeled away from the next sheet 1! B as shown in FIG. 2 there is an advancing line of separation between the corner area of adhesive 14A and the next sheet lib which becomes progressively shorter until reducing to a point of complete separation at the corner point 17. That advancing line of separation is shown by the successive dot-dash lines 20 in FIG. 3. The first line of separation 20 is along the full length of the edge 18 and it becomes progressively shorter until separation at the corner point 17.

Figure 4:
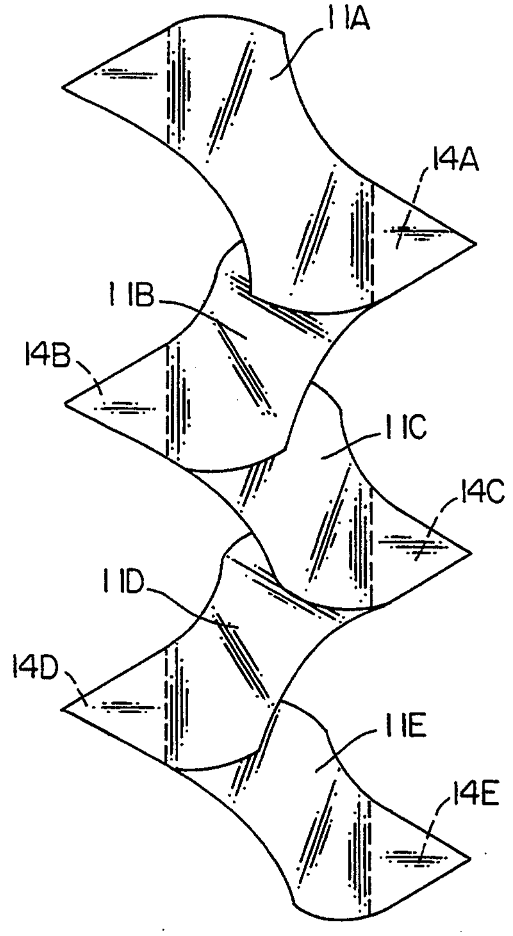
FIG. 4 is a perspective view of how the first six sheets of the stack of FIGS. 1 and 2 appear if all are elevated from the stack by the first of the sheets while still joined together.
Figure 5:
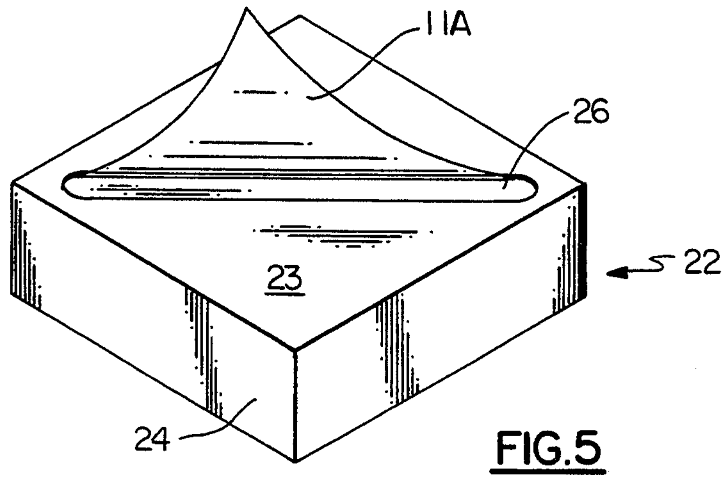
FIG. 5 is a perspective view of a dispenser containing the sheet stack of the invention with the leading corner of the first sheet projecting from the dispenser slot.

The relationship of the sheets 11A to F and the interaction of their respective corner adhesive areas are illustrated in FIG. 4. This shows the appearance of the respective sheets connected to one another by their alternate underside adhesive areas 14A, B, C, etc. when the adhesive-coated leading corner of the top sheet 111A is elevated so as to pull up the next six sheets beneath it from the stack 10. However, in their preferred use the sheets of the stack 10 are not separated apart as shown in FIG. 4. Instead the stack 10 is contained within a dispenser 22 as shown in FIG. 5 having a top 23, sides 24 and a bottom which is not visible. The top 23 of the dispenser 22 or the bottom thereof should be openable for insertion of the stack 10 with very little clearance between the inside walls of the dispenser 22 and the sides of the stack 10. There should be clearance between the top of the stack 10 within the dispenser and the underside of the top 23 to allow for withdrawal of the successive sheets as described below.

A dispenser slot 26 is formed diagonally across the top 23 of the dispenser 22 and the leading corner of the top sheet 11A, having no adhesive, is pulled upwardly through the slot 26 as shown in FIG. 5. Its trailing corner bears the adhesive deposit 14A on its underside releasably adhered to the adhesive-free upper corner of the next sheet 11B. As the first sheet 11A is pulled through the dispenser slot 26 the leading corner of the next sheet 11B is pulled in turn up and around within the dispenser 22 through the dispenser slot 26, and the adhesive area 14A on the first sheet 11A then begins to separate from the now-exposed adhesive-free corner of the next sheet 11B along the advancing line of separation described above in relation to FIG. 3. That process of separation along a progressively shortening separation line ends when the corner point 17 of the sheet 11A leaves the matching corner point of the next sheet 11B.

It will be understood that the first sheet 11A curls around one side of the slot 26 during withdrawal while the next sheet 11B curls around the opposite side of the slot 26 during withdrawal and this process alternates from one sheet to the next and from one side of the slot 26 to the next as all of the sheets are withdrawn in turn. This curling of each sheet during its withdrawal is prevented from creating a permanently set curl by two factors. One is that the curling occurs transverse to the grain 12 of each of the sheets so that the sheet itself presents greater resistance to permanent curling. The second is that tension imposed on each sheet during withdrawal reduces progressively during the peeling away of a given triangular area of adhesive as its lines of separation move from its longest length at the edge 18 to zero at the point 17. The greater the tension imposed on the sheet during this peeling-away process, the more severe is the curling induced in the sheet and the more likely that a permanent set will be left in the curl after complete separation of the sheet.

Figure 6:
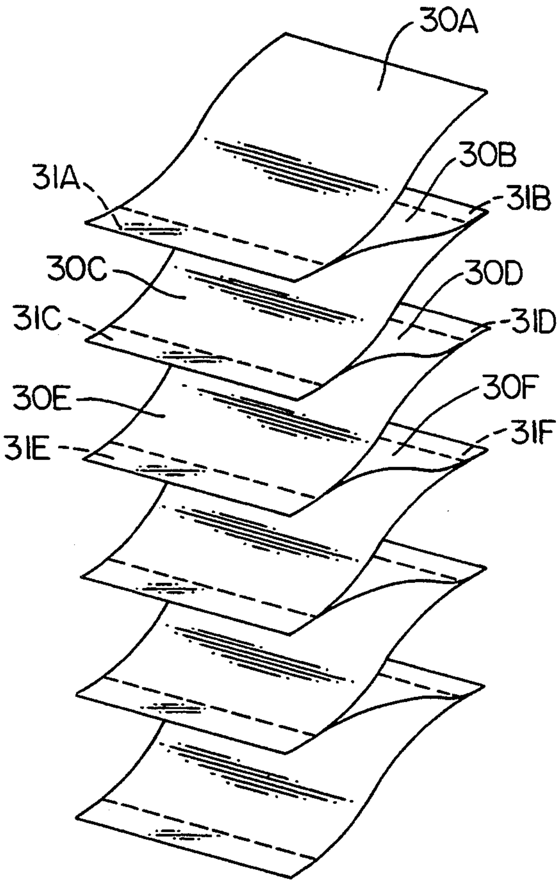
FIG.6 Prior Art
FIG. 6 is a view similar to FIG. 4 of a prior art form wherein the adhesive is in extended bands along the full length of alternating edges of the sheets.

This is in contrast to the prior art placement of the adhesive in extended bands along alternating edges of the sheets. For comparison the prior art edge band placement is illustrated in FIG. 6 in a configuration similar to that of FIG. 4 where the first six sheets 30A to F have been elevated from a stack by lifting the top-most sheet 30A. It will be readily understood that in contrast to the sheets of the present invention the separation lines in the prior art form remain at the full length of the adhesive edge bands 31A to F until complete separation. This imposes a measurably greater amount of tension on each sheet during the peeling-away process and endangers an unwanted permanently set curl in the separated sheets. Since the ultimate object is to improve the ability of the separated sheets to lie flat during use, the corner placement of the adhesive in the sheets of the invention is superior to the edge band placement of the adhesive in the sheets of the prior art shown in FIG. 6.

The scope of the invention is to be determined from the following claims rather than the foregoing description of preferred embodiment.

I claim:

1. A stack of flexible polygonal sheets in combination with a dispenser disposed over one another with low-tack repositionable adhesive on alternate opposite coated areas of successive sheets in the stack, the improvement comprising
   a) said adhesive-coated areas being confined to alternate opposite corner areas of successive sheets in the stack, and
   b) the dispenser defining an exit slot over the stack through which each successive sheet is withdrawable with a corner leading,
   c) whereby as each successive sheet is withdrawn through the dispenser slot and peeled away from the next sheet an advancing line of separation between its adhesive-coated corner area and the next sheet becomes progressively shorter until reducing to a point upon complete separation.

2. A combination according to claim 1 wherein the adhesive-coated areas are on the underside of all of the sheets and an adhesive-free corner leads from the dispenser slot during withdrawal.

3. A combination according to claim 1 wherein the sheets of the stack are rectangular.

4. A combination according to claim 3 wherein each corner area is triangular and coincident with two straight side edge portions of the sheet meeting at a corner point and a third straight side joining ends of said two edge portions remote from said corner point, whereby as each sheet is withdrawn through the dispenser slot the line of separation between its adhesive-coated corner area and the next sheet starts with said third straight side and becomes progressively shorter until reducing to a point at said corner point upon complete separation.

5. A combination according to claim 4 wherein said triangular area is an isosceles triangle.

6. A combination according to claim 4 wherein the lengths of the two straight side edge portions are less than half the full length of any of the sheet edges.

7. A stack of flexible rectangular sheets of a material having a certain grain direction in combination with a dispenser disposed over one another with low-tack repositionable adhesive on alternate opposite coated areas of successive sheets in the stack, the improvement comprising a) said adhesive coated areas being confined to alternate opposite corner areas on the underside of successive sheets in the stack, b) each corner area being triangular and coincident with two straight side edge portions of the sheet of equal length meeting at a corner point and a third straight side joining ends of said two edge portions remote from said corner point, c) the length of the two straight side edge portions being less than half the full length of any of the sheet edges, d) the dispenser defining an exit slot disposed diagonally over the stack through which each successive sheet is withdrawable with an adhesive-free corner leading, e) whereby as each sheet is withdrawn through the dispenser slot an advancing line of separation between its adhesive-coated corner area and the next sheet starts at the length of said third straight side and becomes progressively shorter until reducing to a point at said corner point upon complete separation, f) said line of separation being transverse to said grain direction of the sheet material.

* * * * *